(12) United States Patent
Lee et al.

(10) Patent No.: US 12,070,155 B2
(45) Date of Patent: Aug. 27, 2024

(54) LID OPENER AND AUTOMATIC COOKING APPLIANCE HAVING SAME

(71) Applicant: SHINSTARR PRESENTS CORP., Seoul (KR)

(72) Inventors: Sangrok Lee, Seoul (KR); Jeon Ho Cha, Incheon (KR)

(73) Assignee: SHINSTARR PRESENTS CORP., Seoul (KR)

( * ) Notice: Subject to any disclaimer, the term of this patent is extended or adjusted under 35 U.S.C. 154(b) by 104 days.

(21) Appl. No.: 18/082,371

(22) Filed: Dec. 15, 2022

(65) Prior Publication Data
US 2024/0164574 A1 May 23, 2024

(30) Foreign Application Priority Data
Nov. 23, 2022 (KR) .......................... 10-2022-0158607

(51) Int. Cl.
*A47J 36/12* (2006.01)
*A47J 27/00* (2006.01)
*A47J 36/34* (2006.01)

(52) U.S. Cl.
CPC ............. *A47J 36/12* (2013.01); *A47J 27/002* (2013.01); *A47J 36/34* (2013.01)

(58) Field of Classification Search
CPC ........... A47J 36/12; A47J 36/34; A47J 27/002
USPC ................................. 220/813, 812, 811, 817
See application file for complete search history.

(56) References Cited

U.S. PATENT DOCUMENTS 4,334,633 A * 6/1982 Piegza ..................... F16J 13/20
49/248

FOREIGN PATENT DOCUMENTS

| JP | 2014-514474 A | 6/2014 |
| KR | 10-2007-0111748 A | 11/2007 |
| KR | 10-1471364 B1 | 1/2015 |
| KR | 10-1618052 B1 | 4/2016 |
| KR | 10-2196304 B1 | 12/2020 |

* cited by examiner

*Primary Examiner* — Stephen J Castellano
(74) *Attorney, Agent, or Firm* — Stein IP, LLC

(57) ABSTRACT

Proposed are a lid opener and an automatic cooking appliance having the same. The lid opener includes a main pivot rod having a first fixing pin and a second fixing pin, and a moving pivot rod which is coupled to the first fixing pin and rotates. A lid is opened vertically upward by using the moving pivot rod pinned to the first fixing pin for an initial period of time t1 for which the lid is opened from a container, and after that, the lid is opened by rotating the main pivot rod relative to the second fixing pin. When opening the lid from the container by applying the automatic appliance having a simple structure, the lid is opened vertically upward at an initial state such that steam inside the container is released and liquid sticking to the lower surface of the lid falls into the container.

18 Claims, 16 Drawing Sheets

LID OPENER AND AUTOMATIC COOKING APPLIANCE HAVING SAME

CROSS REFERENCE TO RELATED APPLICATION

The present application claims priority to Korean Patent Application No. 10-2022-0158607, filed Nov. 23, 2022, the entire contents of which are incorporated herein for all purposes by this reference.

BACKGROUND OF THE INVENTION

Field of the Invention

The present disclosure relates generally to a lid opener and a cooking appliance having the same. More particularly, the present disclosure relates to a lid opener having a structure in which in an initial state in which a lid starts to be opened, the lid is moved in a vertically upward direction so that water vapor formed on the lid falls into a container, and after the falling of water vapor, the lid is rotated to a portion outside a vertical upper part of the container so that contents are easily added to or discharged from the container, and a cooking appliance having the same.

Description of the Related Art

A number of cooking appliances having a container which contains food to be cooked and a lid are being used. For example, there is a representative cooking appliance called a pot. Such a pot is used to cook various dishes such as ramen and soybean paste stew. A pot is used to cook dishes by applying fire to a container for a predetermined period of time when food to be cooked is added to the container constituting a main body and a lid is closed on the container. When cooking is completed, the lid of the pot is opened and cooked food contained in the container is transferred to tableware to be eaten.

When a cook opens the lid after cooking is completed, liquid sticking to the lower surface of the lid while steam filled in the container rises falls into the container of the pot. Accordingly, it is common to keep a lid tilted at a vertical upward side of a container for a while such that liquid sticking to the lower surface of the lid falls into the container when a cook opens a lid.

Various cooking appliances cook in such a manner that when cooking, strong pressure is generated inside a container by a heat source applied to the lower part of the container, and the pressure is not released to the outside until cooking is completed. One of these various cooking appliances is a pressure cooker. When cooking using the pressure cooker stops, a cook releases pressure inside the pressure cooker and maintains the lid tilted at the vertical upward side of the container for a while such that liquid sticking to the lower surface of the lid falls into the container.

Even for an appliance that cooks food automatically, it is preferable to let a lid stay at the upper side of a container for a while when the lid is opened from the container. In Korean Patent No. 10-2196304 (hereinafter, Patent Document 1), a rice automatic cooker is proposed. The rice automatic cooker is a cooking appliance that has a container and a lid, and automatically cooks rice 12. FIGS. 1A and 1B are views schematically illustrating a method of automatically separating the lid from the container as proposed in in Patent Document 1. FIG. 1A illustrates a state in which cooking is performed with the lid closed, and FIG. 1B illustrates a state in which the lid is opened after the cooking is completed. In the rice automatic cooker proposed in Patent Document 1, a method of moving one side of the lid 10a in a vertically upward direction by using a vertical rod 91 is applied. When the vertical rod 91 is moved in the vertically upward direction when cooking is completed, the lid 10a is opened at an angle of θ1 from the container 10b relative to a point A as illustrated in FIG. 1B. In this state, steam escapes. However, when the lid is opened as proposed in Patent Document 1, friction frequently occurs at the point A which is the reference of rotation of the lid, and a part of the lid or container at the point A is damaged or a packing thereof is worn out. In addition, liquid 101 sticking to the lower surface of the lid falls to the outside of the container 10b as illustrated in FIG. 1B, so the rice automatic cooker and floor are required to be cleaned periodically.

DOCUMENT OF RELATED ART (Patent Document 1) Korean Patent No. 10-2196304 (registered on Dec. 22, 2020)

SUMMARY OF THE INVENTION

Accordingly, the present disclosure has been made to solve the above problems occurring in the related art, and the present disclosure is intended to propose a lid opener having a simple structure in which when a lid is separated from a container, the lid is opened vertically from the container, and an automatic cooking appliance having the same.

In order to achieve the above objective, according to one aspect of the present disclosure, there is provided a lid opener which opens and closes a lid in a cooking appliance composed of a container into which food to be cooked is inserted and the lid which covers an upper side of the container, the lid opener including: a T-shaped guide pin which is coupled integrally to an upper part of the lid and has a horizontal part and a vertical part; a main pivot rod having a first through hole formed in an upper surface of a front thereof such that the vertical part of the T-shaped guide pin uses the first through hole as a path so as to move vertically, the main pivot rod being coupled elastically to the horizontal part of the T-shaped guide pin; a moving pivot rod which is coupled to the vertical part of the T-shaped guide pin at a front thereof and is pinned to the main pivot rod by a first fixing pin at a rear thereof so that the moving pivot rod rotates relative to the first fixing pin; and a support rod whose lower part is fixedly installed and whose upper part is pinned to a second fixing pin at a rear lower part of the main pivot rod; wherein for a period of time t1 from time at which the lid starts to be opened from the container, the T-shaped guide pin is moved vertically upward by rotating the moving pivot rod relative to the first fixing pin such that the lid is moved vertically upward from the container and opened, and after the period of time t1, the main pivot rod is rotated relative to the second fixing pin such that the lid is opened from the container while rotating.

According to the lid opener and the automatic cooking appliance having the same according to the present disclosure, the lid opener has a simple structure, and in an initial state in which the lid is opened, the lid is opened in a vertically upward direction, thereby discharging water vapor in the container and enabling liquid attached on the lower surface of the lid to fall into the container.

In addition, according to the lid opener and the automatic cooking appliance having the same according to the present disclosure, the lid opener has a simple structure, and after the lid is moved vertically upward, the lid is configured to be completely opened to a portion outside a vertical upper part of the container, thereby enabling easy access into the container when inserting food ingredients to be cooked into or taking cooked food out of the container.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Terminology used herein is for the purpose of describing particular embodiments only and is not intended to be limiting. As used herein, singular forms are intended to include the plural forms as well, unless the context clearly indicates otherwise. It should be understood that terms "comprise", "include", and "have" used in this specification specify the presence of stated features, integers, steps, operations, elements, components, and/or combinations of them but do not preclude the presence or addition of one or more other features, integers, steps, operations, elements, components, and/or combinations thereof.

In addition, in the present specification, an expression "on~or on an upper part of~" means an upper or lower part of a target part which does not necessarily mean an upper side with respect to the direction of gravity. That is, "on~or on an upper part of~" referred to in this specification includes not only an upper or lower part of a target part but also a position in front of or behind the target part.

In addition, when a part of an area or plate is described to be "on or on an upper part" of another part, this includes not only a case in which the part is in contact with or spaced apart from the another part at "directly on or on an upper part" of the another part but also a case in which there is still another part therebetween.

Furthermore, in this specification, when one component is referred to as "coupled" or "connected" to another component, the one component may be directly coupled or directly connected to the other component, but unless specifically stated to the contrary, it should be understood that they may be coupled or connected to each other via still another component therebetween.

In addition, in this specification, terms such as first and second may be used to describe various components, but the components should not be limited by the terms. These terms are only used for the purpose of distinguishing one component from another.

Figure 1A:
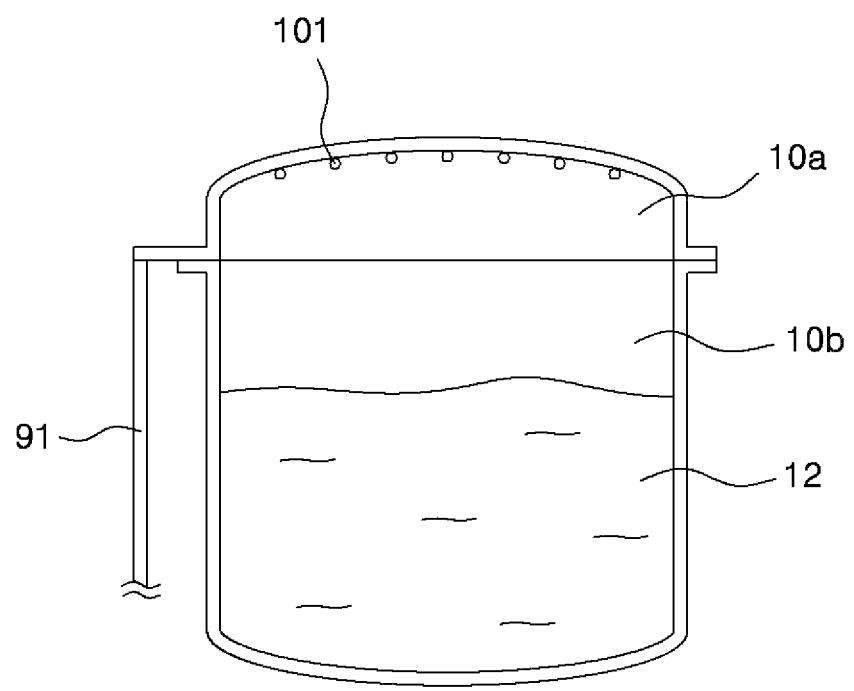
FIGS. 1A and 1B are views schematically illustrating a method of automatically separating a lid from a container as proposed in Patent Document 1.
Figure 1B:
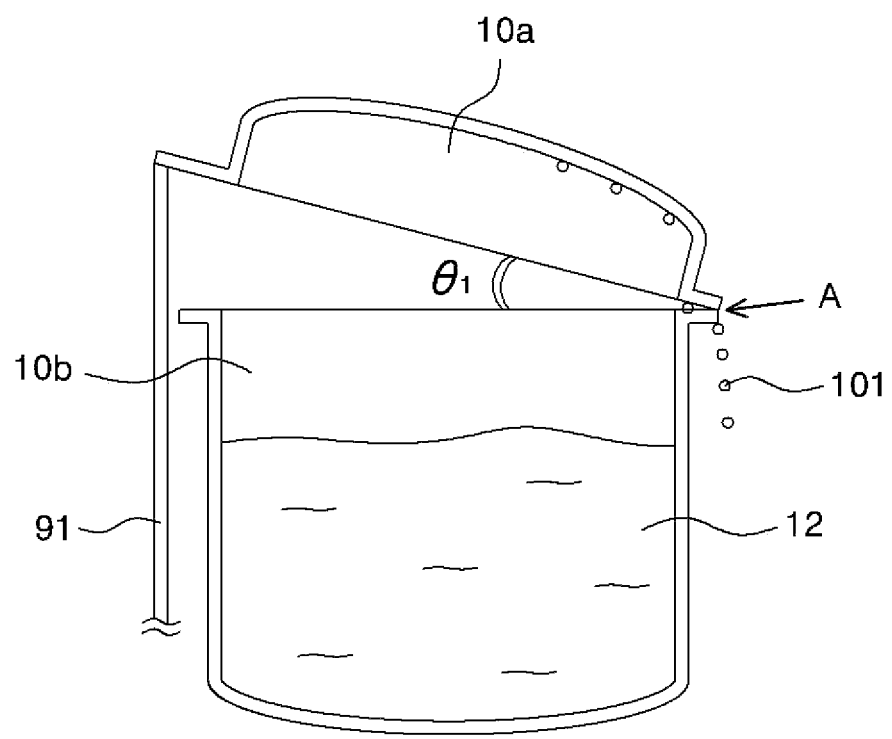
Figure 2A:
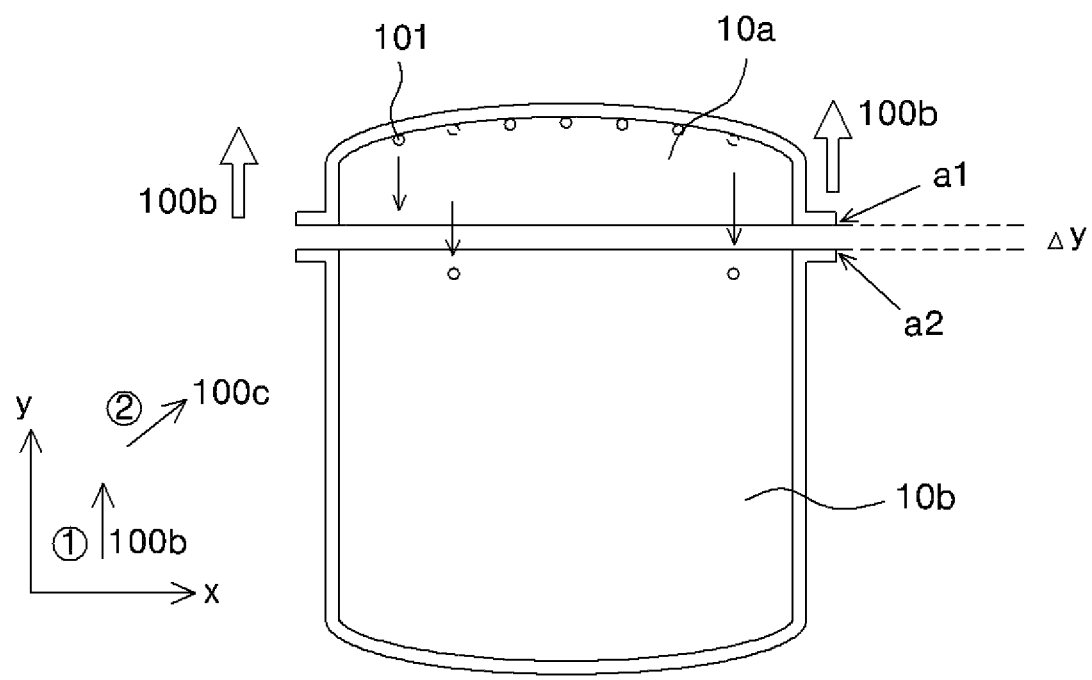
FIGS. 2A and 2B are views illustrating the opened state of the container and the lid at time at which a period of time t1 has elapsed after the lid is opened from an automatic cooking appliance according to the present disclosure, and the opened state of the container and the lid in a state in which the lid is completely opened after the period of time t1.
Figure 2B:
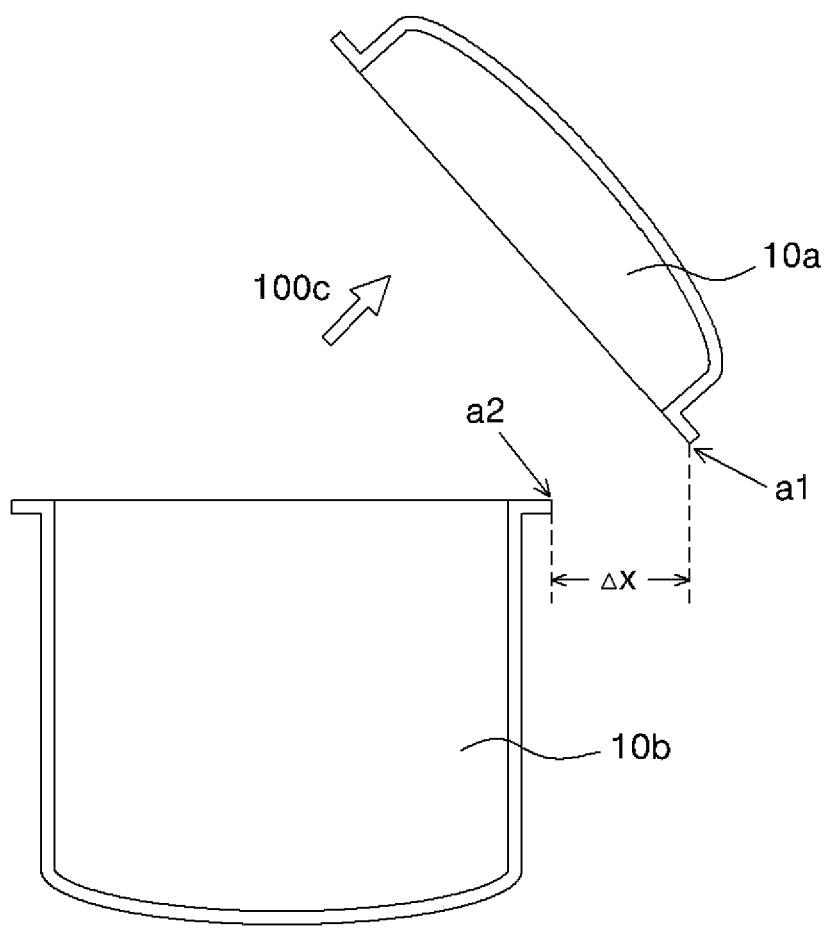

FIGS. 2A and 2B are views illustrating the opened state of the container and the lid at time at which a period of time t1 has elapsed after the lid is opened from an automatic cooking appliance according to the present disclosure, and the opened state of the container and the lid in a state in which the lid is completely opened after the period of time t1. In FIGS. 2A and 2B, a1 and a2 indicate points at which the lid and the container are in contact with each other when the lid is closed on the container.

As illustrated in FIG. 2A, in the automatic cooking appliance according to the present disclosure, for a period of time t1 from time at which the lid 10a starts to be opened from the container 10b, the entirety of the lid 10a is opened to move away as much as Δy vertically upward from the container 10b. In this case, it can be seen that the point a1 is located vertically higher by Δy than the point a2. Here, the period of time t1 means a period of time for which most of water vapor of the container 10b escapes and a considerable amount of liquid attached on the lower surface of the lid 10a during a cooking process cools down and falls into the container 10b. Accordingly, the period of time t1 may vary depending on cooking ingredients, the intensity of fire, and a period of heating time.

FIG. 2B is a view illustrating a state in which the lid 10a is completely opened after the lid 10a rotates relative to the rotation center of the lid 10a after the period of time t1. In this case, it can be seen that the horizontal position of the point a1 is moved in a direction away from the vertical central axis of the container by Δx more than the point a2.

Figure 3A:
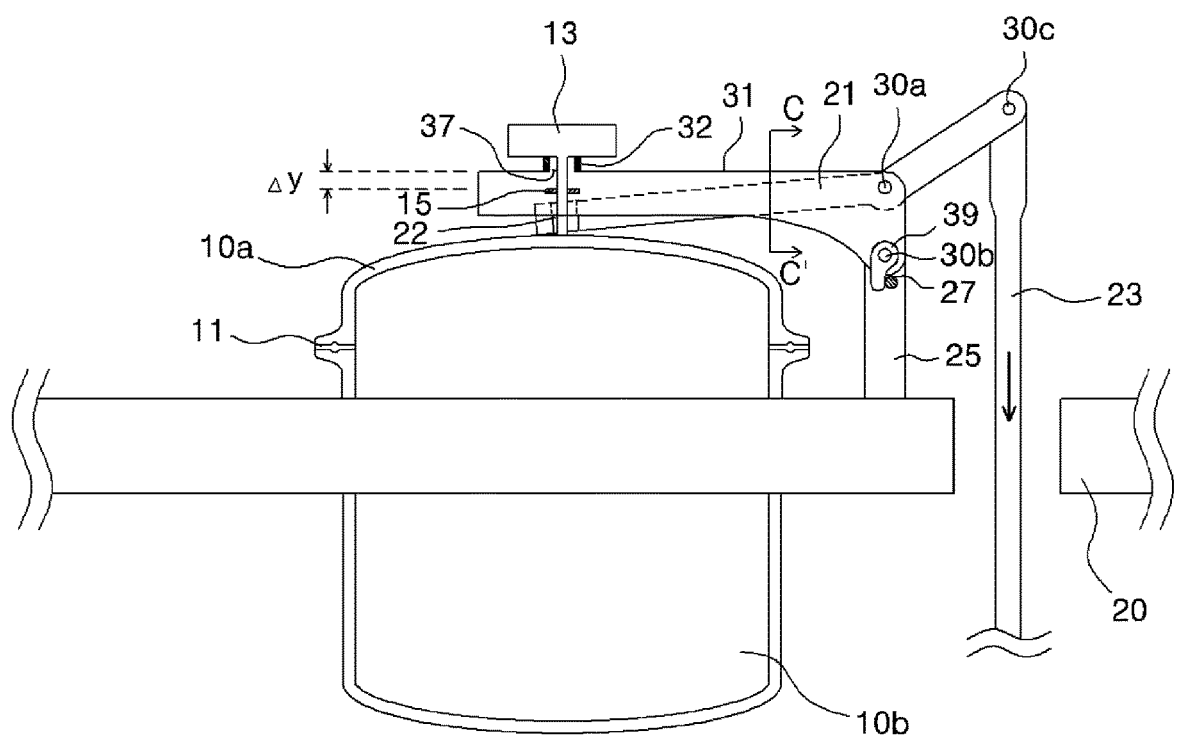
FIGS. 3A to 3C are views illustrating the concept of the automatic cooking appliance having a lid opener in an embodiment according to the present disclosure.
Figure 3B:
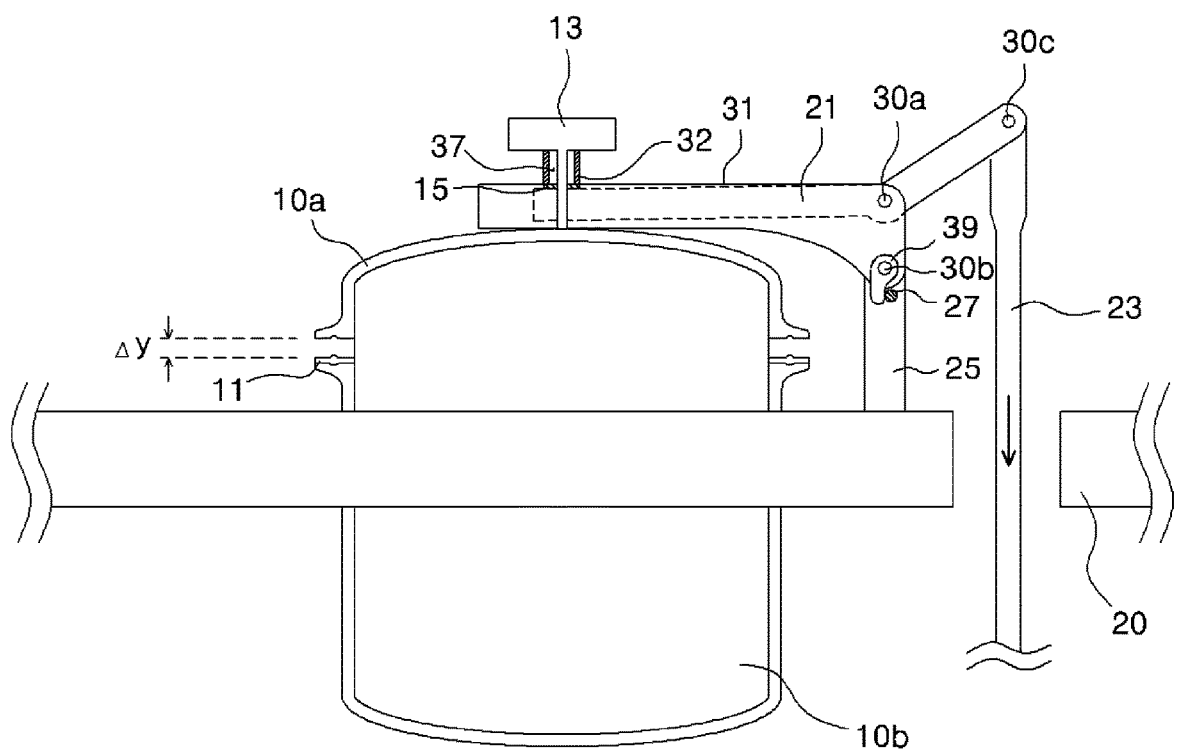
Figure 3C:
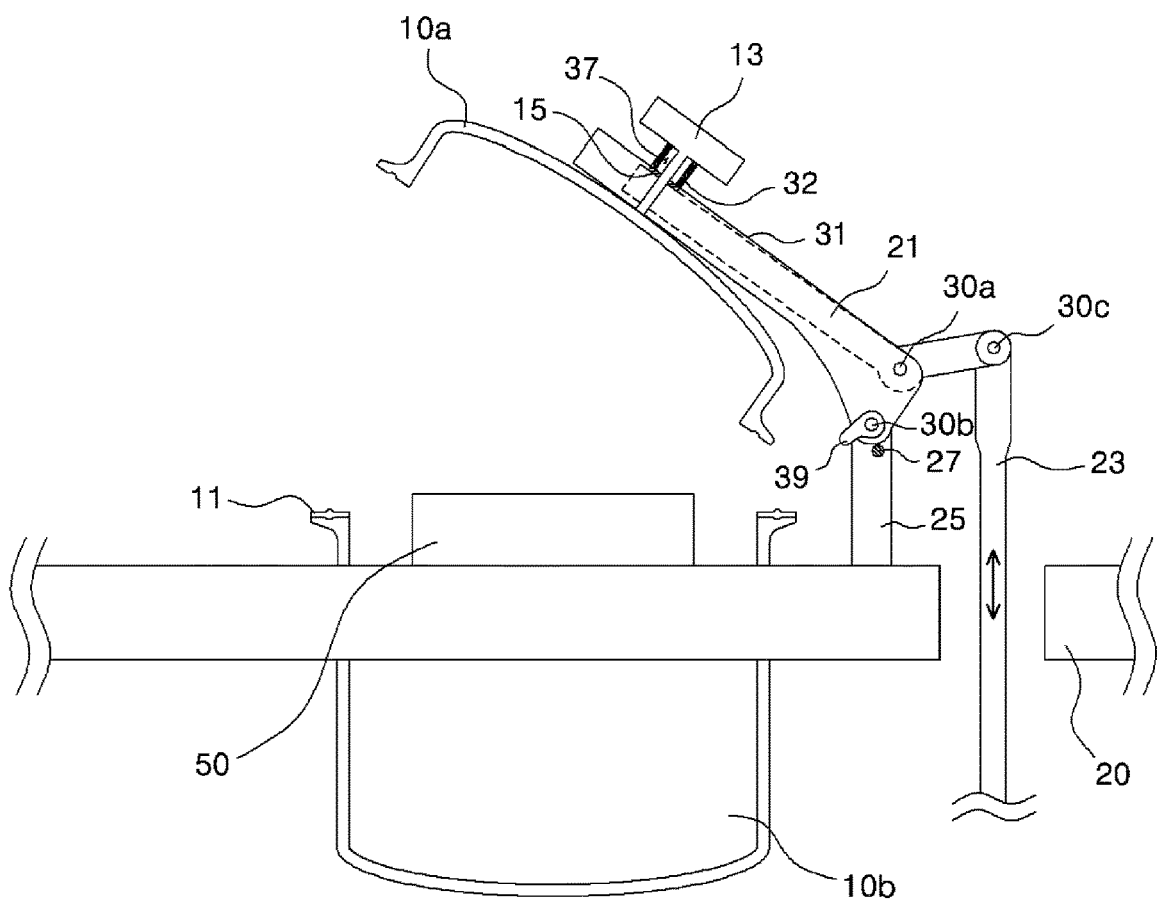

FIGS. 3A to 3C are views illustrating the concept of the automatic cooking appliance having a lid opener in an embodiment according to the present disclosure. FIG. 3A illustrates a state in which the lid is completely closed, FIG. 3B illustrates an initial state in which the lid is opened vertically upward, and FIG. 3C illustrates a state in which the lid is completely opened. The lid opener includes: a T-shaped guide pin 13 coupled integrally to the upper center portion of the lid 10a and having a horizontal part (-) and a vertical part (|); a main pivot rod 31 having a first through hole 37 formed in an upper surface of the front of the main pivot rod 31 such that the vertical part of the T-shaped guide pin 13 uses the first through hole 37 as a path to move vertically, and having a first fixing pin groove formed in an upper portion of a rear side surface of the main pivot rod 31 and a second fixing pin groove formed in a lower portion of the rear side surface thereof; a first fixing pin 30a and a second fixing pin 30b inserted into and installed respectively in the first fixing pin groove and the second fixing pin groove; a moving pivot rod 21 having an elongated bar shape whose first end is coupled to the vertical part of the T-shaped guide pin 13 and whose second end is formed to protrude to a side behind the main pivot rod 31 such that the second end is pinned to a first moving pin 30*c*, the moving pivot rod 21 being pinned to the first fixing pin 30*a* located between a center perpendicular to the longitudinal direction of the moving pivot rod 21 and the second end such that the moving pivot rod 21 seesaws relative to the first fixing pin 30*a*; a support rod 25 whose lower part is fixedly installed and whose upper part is pinned to the second fixing pin 30*b*; a first vertical rod 23 having an upper end pinned to the second end of the moving pivot rod 21 by the first moving pin 30*c*, the first vertical rod 23 being configured to transmit power to vertically raise or lower the second end of the moving pivot rod 21; a rotating protrusion 39 which is fixed to the main pivot rod 31 and rotates together with the main pivot rod 31 relative to the second fixing pin 30*b*; and a stop pin 27 which is formed on the support rod 25 by protruding therefrom and limits a rotation radius of the rotating protrusion 39.

The container 10*b* is installed to be fixed to a support shelf 20, and the lid 10*a* is placed on the container 10*b*. A gasket 11 is installed on the lower surface of the edge of the lid 10*a* in contact with the upper surface of the container 10*b* such that when the lid 10*a* closes the container 10*b*, airtightness is maintained. The gasket 11 may be installed on the upper surface of the container 10*b* instead of being installed on the lower surface of the edge of the lid 10*a*, or may be installed to be inserted into grooves by forming the grooves in the edges of the lid 10*a* and the container 10*b* in contact with each other.

The T-shaped guide pin 13 includes the horizontal part (-) and the vertical part (|) and has a T shape. The lower part of the vertical part is installed to be fixed to the upper center of the lid 10*a* such that the T-shaped guide pin 13 moves integrally with the lid 10*a*. The method of fixing the lower part of the T-shaped guide pin 13 to the upper center of the lid 10*a* includes methods of screwing and welding. The vertical part (|) of the T-shaped guide pin 13 is provided with a coupling part coupled to the moving pivot rod 21, so when the moving pivot rod 21 moves upward, the T-shaped guide pin 13 is moved upward. In the embodiment of FIG. 3A, a through hole is horizontally formed in the vertical part, and a holding body 15 inserted into the through hole constitutes the coupling part.

The main pivot rod 31 is provided with the first through hole 37 formed in the upper surface of the front thereof such that the vertical part of the T-shaped guide pin 13 uses the first through hole 37 as a path to move vertically, and is provided with the first fixing pin groove formed in the upper portion of the rear side surface and the second fixing pin groove formed in the lower portion of the rear side surface thereof. The main pivot rod 31 is pinned to the moving pivot rod 21 by the first fixing pin 30*a* inserted into and installed in the first fixing pin groove, and is pinned to the support rod 25 by the second fixing pin 30*b* inserted into and installed in the second fixing pin groove. The upper surface of the main pivot rod 31 and the lower surface of the horizontal part (-) of the T-shaped guide pin 13 are elastically coupled to each other by an elastic coupling body 32 provided along the circumferential surface of the first through hole 37. The first through hole 37 is formed to have a diameter larger than the diameter of the vertical part of the T-shaped guide pin 13 and smaller than the horizontal length of the holding body 15. A vertical distance between the upper surface of the holding body 15 and the upper surface of the main pivot rod 31 is Δy. As the elastic coupling body 32, a spring, thermoplastic elastomer TPE, and polyurethane elastomer, etc. may be used.

Figure 8A:
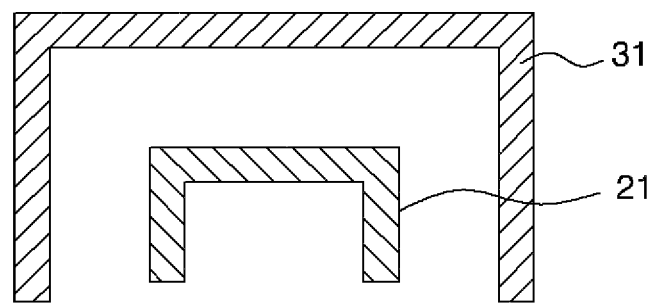
FIGS. 8A and 8B respectively illustrate sectional views of a main pivot rod 31 and a moving pivot rod of a C-C' direction of FIG. 3A.
Figure 8B:
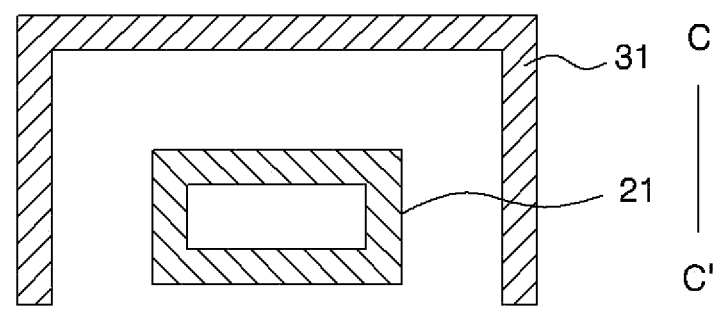

FIGS. 8A and 8B respectively illustrate sectional views of the main pivot rod 31 and the moving pivot rod 21 of a C-C' direction of FIG. 3A, and in the sectional view of the main pivot rod 31, it can be known that the main pivot rod 31 has a rectangular shape by having empty space defined therein and an open lower surface. The moving pivot rod 21 may also be formed to have a rectangular shape by having empty space defined therein and an open lower surface as illustrated in FIG. 8A, or may be formed to have a rectangular shape by having empty space defined therein and a closed lower surface as illustrated in FIG. 8B

The moving pivot rod 21 is a member which provides a function to move the lid 10*a* vertically upward while the first end of the moving pivot rod 21 moves vertically upward relative to the first fixing pin 30*a* when the first vertical rod 23 pinned to the first moving pin 30*c* moves vertically downward.

The vertical part of the T-shaped guide pin 13 is coupled to the first end of the moving pivot rod 21. In FIG. 3A, a second through hole 22 is formed in the first end of the moving pivot rod 21 by passing vertically therethrough, and the vertical part of the T-shaped guide pin 13 is inserted into the second through hole 22 such that the T-shaped guide pin 13 is coupled to the moving pivot rod 21. The first end of the moving pivot rod 21 is in contact with the lower part of the holding body 15 while the first end of the moving pivot rod 21 moves vertically upward relative to the first fixing pin 30*a* when the first vertical rod 23 pinned to the first moving pin 30*c* moves vertically downward, and when upward moving force is continuously applied to the lower part of the holding body 15, the moving pivot rod 21 moves the T-shaped guide pin 13 upward so that the lid 10*a* moves vertically upward. In FIG. 3A, the lower part of the holding body 15 and the upper surface of the moving pivot rod 21 around the second through hole 22 are illustrated to be spaced apart from each other but may be coupled to each other without space therebetween.

As illustrated in FIG. 3B, the holding body 15 moves vertically upward till time t1 at which the upper surface of the holding body 15 is in contact with the lower part of the upper surface of the main pivot rod 31. During change from the state of FIG. 3A to the state of FIG. 3B, the main pivot rod 31 does not move, and thus the rotating protrusion 39 installed fixedly to the main pivot rod 31 is maintained to be seated on the stop pin 27.

When power to move the first vertical rod 23 downward is continuously provided in the state of FIG. 3B, the main pivot rod 31 rotates relative to the second fixing pin 30*b*, and as illustrated in FIG. 3C, the lid 10*a* is opened while moving away from the container 10*b* in an upper right direction. During change from the state of FIG. 3B to FIG. 3C, since the main pivot rod 31 rotates relative to the second fixing pin 30*b*, the rotating protrusion 39 installed fixedly to the main pivot rod 31 also rotates and gradually moves away from the stop pin 27.

The closing operation of the lid 10*a* from the opened state of the lid 10*a* proceeds in the order of FIGS. 3C, 3B, and 3A. When vertically upward force is applied to the first vertical rod 23 in the opened state of the lid 10*a* as illustrated in FIG. 3C, the main pivot rod 31 rotates relative to the second fixing pin 30*b* until the rotating protrusion 39 is in contact with the stop pin 27, and is restored to the state of FIG. 3B.

When vertically upward force is continuously applied to the first vertical rod 23 in the state of FIG. 3B, the main pivot rod 31 does not rotate any longer since the rotating protrusion 39 is in contact with the stop pin 27, and by using the restoring force of the elastic coupling body 32 which is compressed, the moving pivot rod 21 moves as much as Δy vertically downward relative to the first fixing pin 30a until the moving pivot rod 21 is in the state of FIG. 3A. The lid 10a moves vertically downward immediately before the lid 10a closes the upper side of the container 10b due to such movement.

In addition to the lid opener described above, the automatic cooking appliance having the lid opener includes: a cooking appliance composed of the lid 10a and the container 10b; the support shelf 20 fixing the container 10b; a support 61 which is located on the support shelf 20 and supports the lower surface of the edge of the container 10b; a tightening device 50 which seals the edges of the lid and the container by applying pressure thereto from a side; and a motor (not shown) which provides power to the first vertical rod 23. The support 61 is a member which is located on the support shelf 20 and securely fixes the lower surface of the edge of the container 10b, and may be formed of a material such as Teflon or silicon that can withstand high temperatures.

Figure 4A:
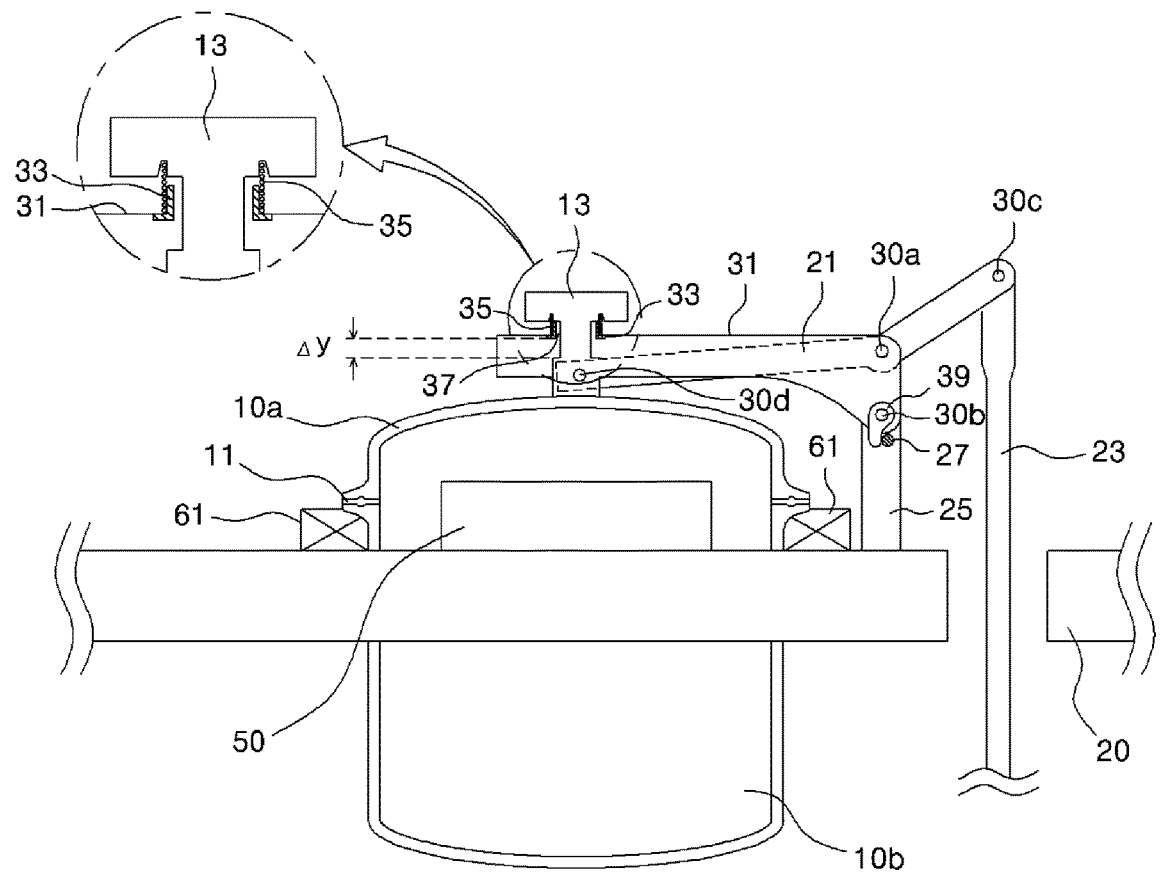
FIGS. 4A to 4C are views illustrating the concept of the automatic cooking appliance having the lid opener in another embodiment according to the present disclosure.
Figure 4B:
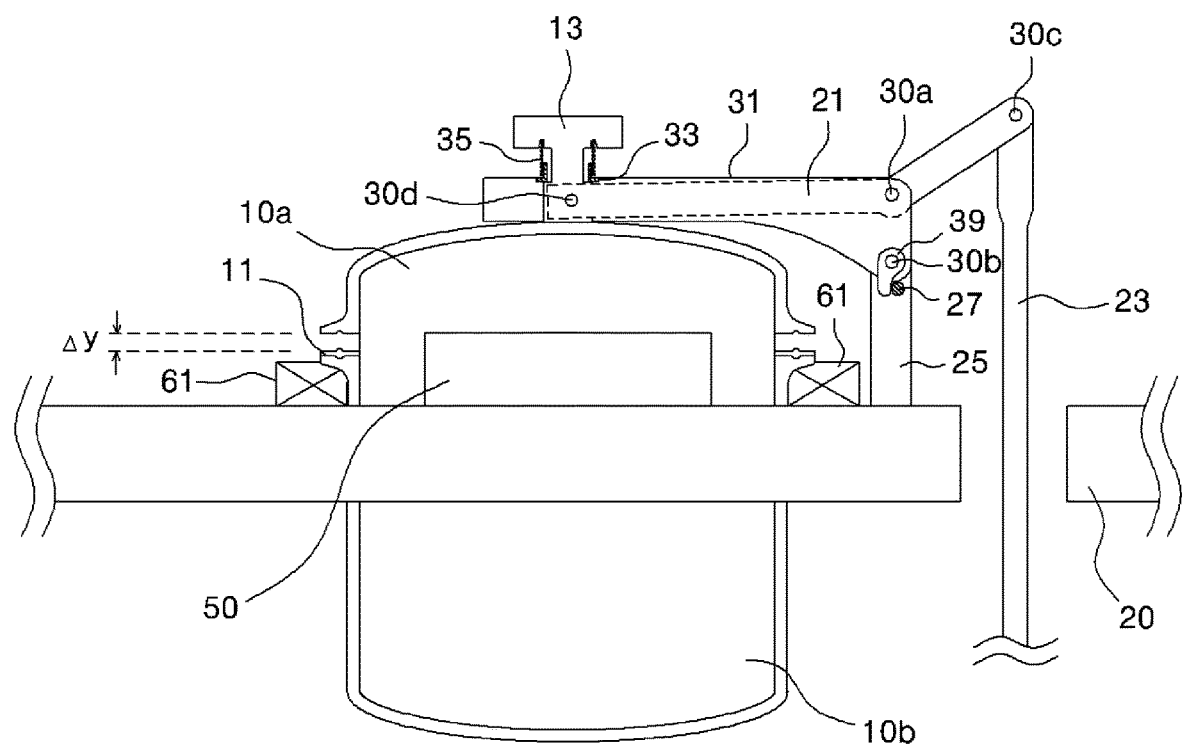
Figure 4C:
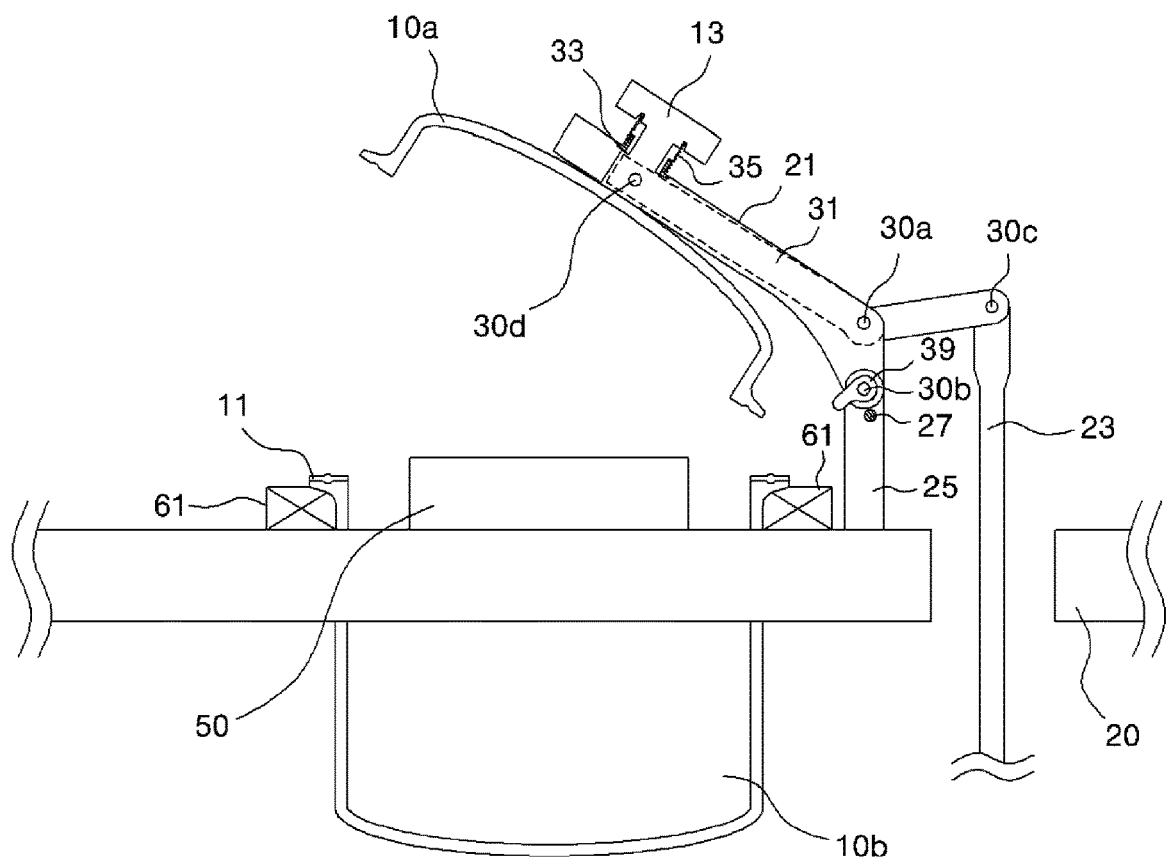

FIGS. 4A to 4C are views illustrating the concept of the automatic cooking appliance having the lid opener in another embodiment according to the present disclosure. FIG. 4A illustrates a state in which the lid is completely closed, FIG. 4B illustrates an initial state in which the lid is opened, and FIG. 4C illustrates a state in which the lid is completely opened. Difference between the lid opener illustrated in FIG. 4A and the lid opener illustrated in FIG. 3A includes the configuration of the T-shaped guide pin 13, the coupling method of the T-shaped guide pin 13 and the moving pivot rod 21 to each other, and the embodiment of the elastic coupling body 32 into a first spring 35. A guide bush 33 is installed in the first through hole 37 so that the T-shaped guide pin 13 can move more efficiently.

Figure 9A:
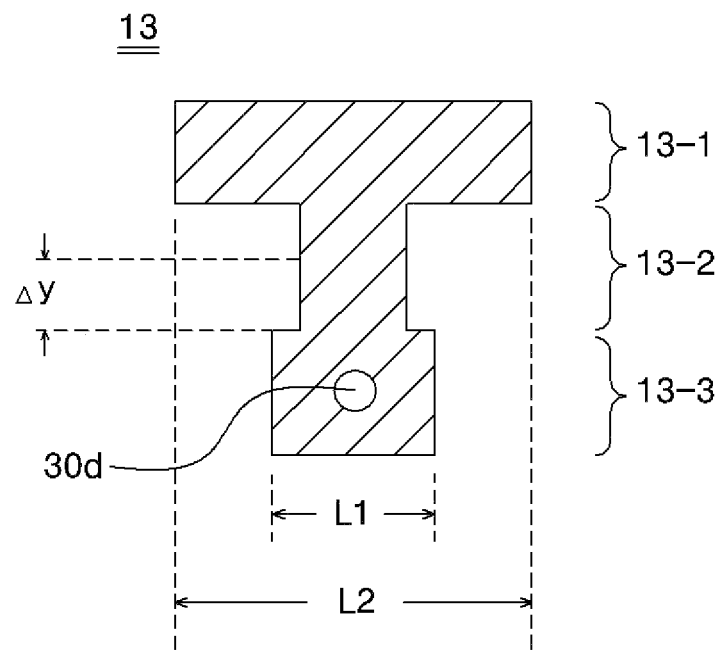
FIGS. 9A and 9B are views illustrating the appearance of a T-shaped guide pin used in the lid opener illustrated in FIG. 4A.
Figure 9B:
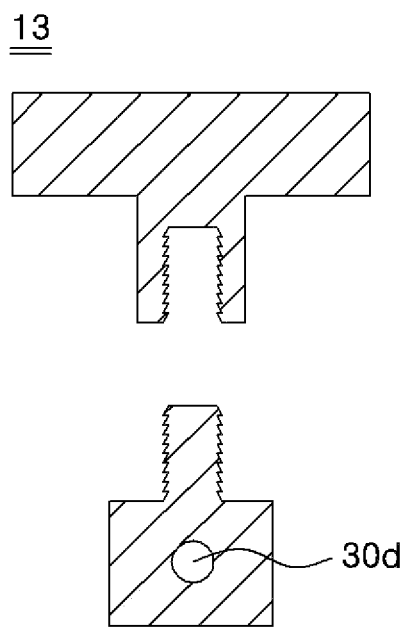

FIGS. 9A and 9B illustrate the appearance of the T-shaped guide pin 13 of the embodiment presented in FIG. 4A. The T-shaped guide pin 13 of the embodiment presented in FIG. 4A includes: a horizontal part 13-1 having a horizontal length L2; a bottleneck part 13-2 formed by being connected to the lower center of the horizontal part 13-1; and a stepped part 13-3 formed to be connected to the lower part of the bottleneck part 13-2 and having a horizontal length L1. That is, the vertical part of the T-shaped guide pin 13 includes the bottleneck part 13-2 and the stepped part 13-3. A third fixing pin 30d is formed on the stepped part 13-3 by protruding therefrom, and the front part of the moving pivot rod 21 is pinned to the associated third fixing pin 30d. For reference, the lower part of the stepped part 13-3 is coupled to the center of the upper surface of the lid such that the T-shaped guide pin 13 and the lid can move together. The horizontal length L1 of the stepped part 13-3 is required to be larger than the diameter of the first through hole 37. As illustrated in FIG. 9B, the T-shaped guide pin 13 may include two coupling parts that are screwed to each other to improve assemblability.

In the lid opener of FIG. 3A, the holding body 15 defines a vertical movement distance Δy by which the lid 10a moves in a vertical direction, and the moving pivot rod 21 functions to move the T-shaped guide pin 13 upward. In the lid opener of FIG. 4A, the function of the holding body 15 is simplified by changing the shape of the T-shaped guide pin 13. Until the upper surface of the stepped part 13-3 of the T-shaped guide pin 13 is in contact with the lower surface (precisely, the lower surface of the guide bush 33) of the main pivot rod 31, the lid 10a move as much as Δy vertically upward for the period of time t1, and the moving pivot rod 21 is coupled to the third fixing pin 30d formed on the stepped part 13-3 by protruding therefrom such that the moving pivot rod 21 moves the T-shaped guide pin 13 upward.

Figure 5:
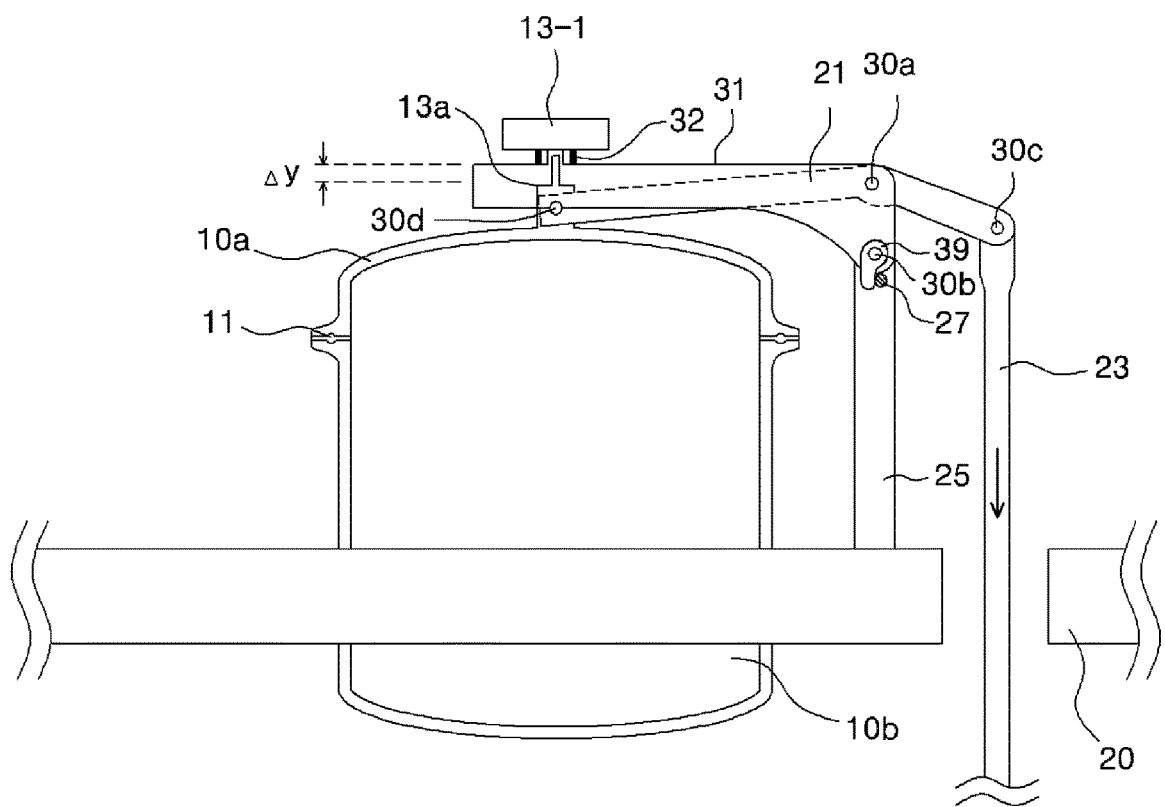
FIG. 5 is a view illustrating the concept of the automatic cooking appliance having the lid opener in still another embodiment according to the present disclosure.

FIG. 5 is a view illustrating the concept of the automatic cooking appliance having the lid opener in still another embodiment according to the present disclosure. FIG. 5 illustrates a state in which the lid is completely closed. The lid opener illustrated in FIG. 5 is different from the lid opener illustrated in FIG. 4A in that the T-shaped guide pin 13 in FIG. 5 is configured as a separable type of guide pin. That is, in the embodiment presented in FIG. 5, the T-shaped guide pin 13 includes the horizontal part 13-1 having the horizontal length L2 and the vertical part 13a which are separable from each other. Another difference between the lid opener illustrated in FIG. 5 and the lid opener illustrated in FIG. 4A is that in FIG. 5, the portion of the moving pivot rod 21 protruding to a side behind the main pivot rod 31 is formed to bend downward.

In the lid opener illustrated in FIG. 5, the lid 10a does not move before the upper end part of the vertical part 13a is in contact with the lower surface of the horizontal part 13-1 although the moving pivot rod 21 moves upward. When the moving pivot rod 21 moves upward after the upper end part of the vertical part 13a is in contact with the lower surface of the horizontal part 13-1, the lid 10a is moved upward, and a subsequent operations thereof are similar to the operations in FIGS. 3B and 3C.

However, in the lid opener illustrated in FIG. 5, noise may be generated when the upper end part of the vertical part 13a is in contact with the lower surface of the horizontal part 13-1 while the lid 10a is closed and opened, and thus a damper for absorbing impact is preferably installed on the upper end part of the vertical part 13a or the lower surface of the horizontal part 13-1.

Figure 6:
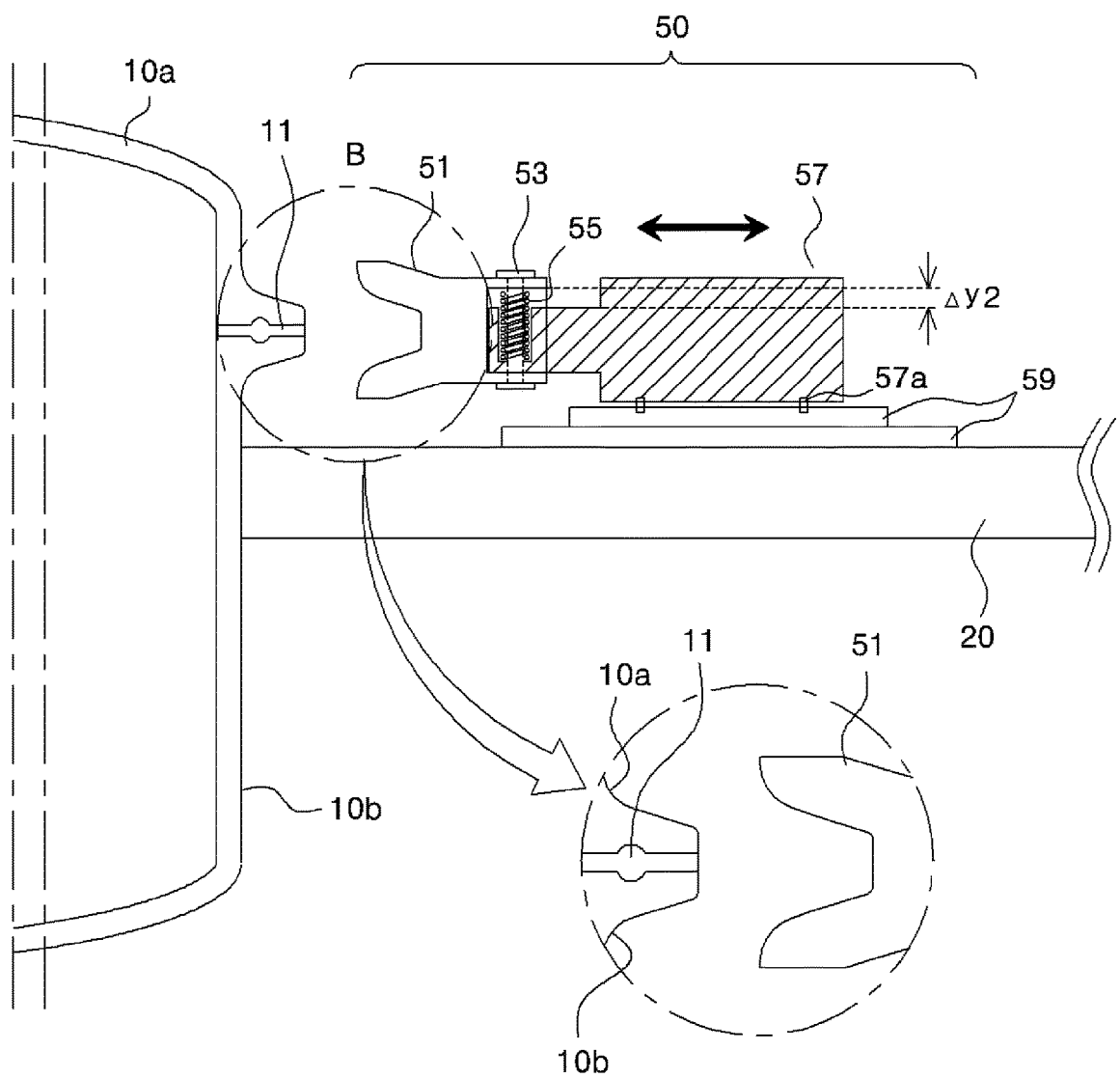
FIG. 6 is a view illustrating the configuration of a tightening device in the embodiment according to the present disclosure.
Figure 7A:
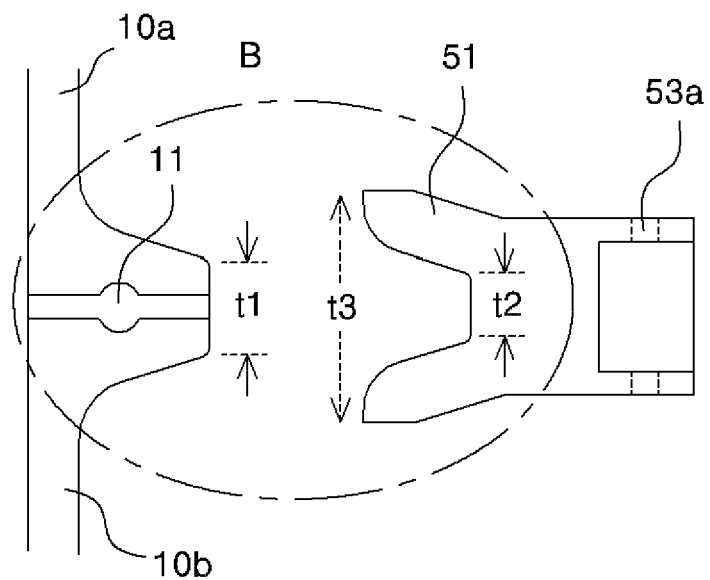
FIGS. 7A and 7B are views illustrating the shape of a ferrule tightening part constituting the tightening device and the shape of a power transmission part.
Figure 7B:
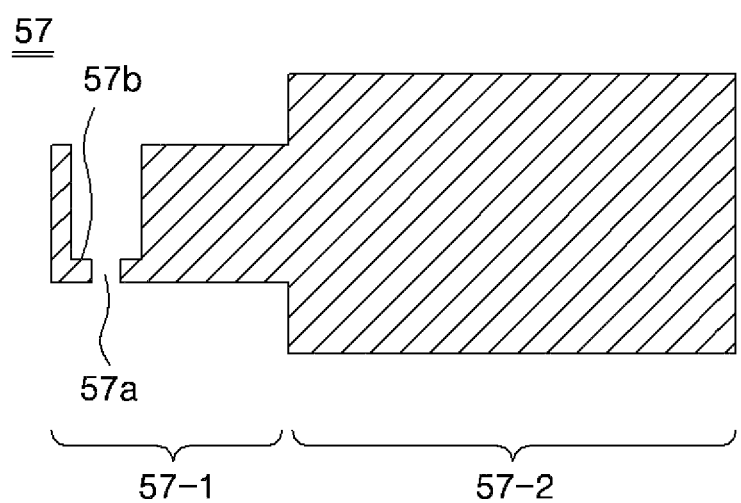

FIG. 6 is a view illustrating the configuration of the tightening device in the embodiment according to the present disclosure, and FIGS. 7A and 7B are views illustrating the shape of a ferrule tightening part constituting the tightening device and the shape of a power transmission part. The tightening device 50 is a device which provides a function to securely tighten the edges of the lid 10a and the container 10b from a side thereof, and which securely fixes the lid 10a to the container 10b so as to seal the container 10b even when high pressure is generated inside the container 10b during cooking. The tightening device 50 is composed of a ferrule tightening part 51, a power transmission part 57, and a linear guide 59.

The ferrule tightening part 51 is a part that tightens the lid 10a and the container 10b in a closed state so that the lid 10a and the container 10b are fixedly sealed so as to withstand pressure generated inside the container 10b. The ferrule tightening part 51 includes: a front part having a coupling part provided at a front thereof, the coupling part which matches the outlines of the closed lid 10a and container 10b and is formed into a wedge shape inward; and a first space part 52 recessed inward at a rear of the ferrule tightening part 51. In order to define the first space part 52, a protruding part is formed on each of the upper and lower parts of the rear of the ferrule tightening part 51, and a second through hole 53a is formed in the protruding part. A vertical through pin 53 is installed to be inserted into the second through hole 53a, and a second spring 55 is fitted over the outer circumferential surface of the vertical through pin 53.

As illustrated in FIG. 7A, assuming that height between the lid 10a and the container 10b is t1 in a state in which the lid 10a is placed above the container 10b, the (maximum) height of the starting point of the inclined surface of the ferrule tightening part 51 is t3, and the (minimum) height of the stop point of the inclined surface is t2. Here, it is necessary to have the relationship of "t3>t1>t2".

As illustrated in FIG. 7B, the power transmission part 57 includes a front part 57-1 having an approximate "L" shape coupled to the first space part 52 of the ferrule tightening part 51, and a body part 57-2 formed integrally with the rear of the front part 57-1. A first coupling pin hole 57a is formed in the bottom surface of the front part 57-1 having the "L" shape. As illustrated in FIGS. 6, 7A, and 7B, a spring seating part 57b is formed outside the outer circumference of the first coupling pin hole 57a, and the second spring 55 is installed between the spring seating part 57b and the lower surface 51a of the upper protruding part of the ferrule tightening part 51 defining the first space part 52. The power transmission part 57 is coupled to the linear guide 59 by a first coupling pin.

The ferrule tightening part 51 is configured to be coupled to the power transmission part 57 by the second spring 55 such that the ferrule tightening part 51 can move by Δy2 in a vertical direction in the drawing.

When the lid 10a is placed on the container 10b, the power transmission part 57 is moved leftward relative to FIG. 6 by the linear guide 59. Accordingly, the ferrule tightening part 51 is also moved leftward, and wedge-shaped inclined surfaces provided on the front of the ferrule tightening part 51 firmly fix the edges of the lid 10a and the container 10b to each other, so high-pressure airtightness of the container 10b is maintained while food is cooked.

Although the exemplary embodiments of the present invention have been described and illustrated by using specific terms, such terms are only used to clearly explain the present disclosure, and it is obvious that various modifications and changes may be made to the embodiments of the present disclosure and the described terms without departing from the technical spirit and scope of the following claims. Such modified embodiments should not be individually understood from the spirit and scope of the present disclosure, and should be understood to fall within the scope of the claims of the present disclosure.

What is claimed is:

1. A lid opener which opens and closes a lid in a cooking appliance composed of a container into which food to be cooked is inserted and the lid which covers an upper side of the container, the lid opener comprising:
    a T-shaped guide pin (13) which is coupled integrally to an upper part of the lid (10a) and has a horizontal part (-) and a vertical part (|);
    a main pivot rod (31) having a first through hole (37) formed in an upper surface of a front thereof such that the vertical part of the T-shaped guide pin (13) uses the first through hole (37) as a path so as to move vertically, the main pivot rod (31) being coupled elastically to the horizontal part (-) of the T-shaped guide pin (13);
    a moving pivot rod (21) which is coupled to the vertical part (|) of the T-shaped guide pin (13) at a front thereof and is pinned to the main pivot rod (31) by a first fixing pin (30a) at a rear thereof so that the moving pivot rod (21) rotates relative to the first fixing pin (30a); and
    a support rod (25) whose lower part is fixedly installed and whose upper part is pinned to a second fixing pin (30b) at a rear lower part of the main pivot rod (31);
    wherein for a period of time t1 from time at which the lid (10a) starts to be opened from the container, the T-shaped guide pin (13) is moved vertically upward by rotating the moving pivot rod (21) relative to the first fixing pin such that the lid (10a) is moved vertically upward from the container (10b) and opened, and after the period of time t1, the main pivot rod (31) is rotated relative to the second fixing pin (30b) such that the lid (10a) is opened from the container (10b) while rotating.

2. The lid opener of claim 1, wherein the main pivot rod (31) is provided with a first fixing pin groove formed in an upper portion of a rear side surface thereof and a second fixing pin groove formed in a lower portion of the rear side surface thereof; the first fixing pin (30a) is inserted into and installed in the first fixing pin groove; and the second fixing pin (30b) is inserted into and installed in the second fixing pin groove,
    the moving pivot rod (21) is formed as an elongated bar shape from the front of the moving pivot rod to a portion of the moving pivot rod coupled to the first fixing pin (30a); a rear end of the moving pivot rod (21) is formed to protrude to a side behind the main pivot rod (31) and is pinned to a first moving pin (30c); and a rear portion of the moving pivot rod (21) coupled to the first fixing pin (30a) is located between a center perpendicular to a longitudinal direction of the moving pivot rod (21) and the rear end thereof,
    the lid opener further comprises: a rotating protrusion (39) which is fixed to the main pivot rod (31) and rotates together with the main pivot rod (31) relative to the second fixing pin (30b); and a stop pin (27) formed on the support rod (25) by protruding therefrom and limits a rotation radius of the rotating protrusion (39), and
    the rotating protrusion (39) is disposed to be in contact with the stop pin (27) for the period of time t1 while the lid (10a) covers the container (10b).

3. The lid opener of claim 2, further comprising:
    a first vertical rod (23) being pinned to the first moving pin (30c) at an upper end thereof, the first vertical rod (23) being configured to transmit power so as to vertically raise or lower the rear end of the moving pivot rod (21).

4. The lid opener of claim 3, wherein while the lid (10a) covers the upper side of the container (10b), an upper surface of the moving pivot rod (21) is coupled to the vertical part (|) at a position spaced apart by at least a distance Δy from an upper surface of the main pivot rod (31).

5. An automatic cooking appliance comprising:
    the lid opener of claim 3; and
    a support shelf (20) which supports the container (10b).

6. The lid opener of claim 2, wherein while the lid (10a) covers the upper side of the container (10b), an upper surface of the moving pivot rod (21) is coupled to the vertical part (|) at a position spaced apart by at least a distance Δy from an upper surface of the main pivot rod (31).

7. An automatic cooking appliance comprising:
    the lid opener of claim 2; and
    a support shelf (20) which supports the container (10b).

8. The lid opener of claim 1, wherein while the lid (10a) covers the upper side of the container (10b), an upper surface of the moving pivot rod (21) is coupled to the vertical part (|) at a position spaced apart by at least a distance Δy from an upper surface of the main pivot rod (31).

9. The lid opener of claim 1, wherein a stepped part (13-3) having an enlarged diameter is provided on a lower part of the vertical part (|) of the T-shaped guide pin (13); a third fixing pin (30d) is provided on the stepped part (13-3); and the front of the moving pivot rod (21) is coupled to the stepped part (13-3) by the third fixing pin (30d).

10. The lid opener of claim 9, wherein the T-shaped guide pin (13) is formed to have two parts in such a manner that the horizontal part (-) and the vertical part (|) are configured to be separated from each other.

11. An automatic cooking appliance comprising:
the lid opener of claim 9; and
a support shelf (20) which supports the container (10b).

12. The lid opener of claim 1, further comprising:
a holding body (15) formed to protrude to an outside in such a manner that a through hole is formed in the vertical part (|) of the T-shaped guide pin (13) by horizontally passing therethrough such that the holding body (15) is fitted into the through hole, with the front of the moving pivot rod (21) being coupled to a portion of the vertical part (|) located under the holding body (15).

13. The lid opener of claim 12, wherein the T-shaped guide pin (13) is formed to have two parts in such a manner that the horizontal part (-) and the vertical part (|) are configured to be separated from each other.

14. An automatic cooking appliance comprising:
the lid opener of claim 12; and
a support shelf (20) which supports the container (10b).

15. The lid opener of claim 1, wherein the T-shaped guide pin (13) and the main pivot rod (31) are elastically coupled to each other by an elastic spring.

16. An automatic cooking appliance comprising:
the lid opener of claim 15; and
a support shelf (20) which supports the container (10b).

17. An automatic cooking appliance comprising:
the lid opener of claim 1; and
a support shelf (20) which supports the container (10b).

18. The automatic cooking appliance of claim 17, wherein while the lid (10a) covers the upper side of the container (10b), an upper surface of the moving pivot rod (21) is coupled to the vertical part (|) at a position spaced apart by at least a distance $\Delta y$ from an upper surface of the main pivot rod (31).

* * * * *